F. D. THURMAN.
Harness.

No. 222,331. Patented Dec. 2, 1879.

WITNESSES:
W. W. Hollingsworth
Edw. W. Byrn.

INVENTOR:
F. D. Thurman
BY
ATTORNEYS.

UNITED STATES PATENT OFFICE.

FENDAL D. THURMAN, OF ATLANTA, GEORGIA.

IMPROVEMENT IN HARNESS.

Specification forming part of Letters Patent No. 222,331, dated December 2, 1879; application filed October 31, 1879.

*To all whom it may concern:*

Be it known that I, Dr. FENDAL D. THURMAN, of Atlanta, in the county of Fulton and State of Georgia, have invented a new and useful Improvement in Harness; and I do hereby declare that the following is a full, clear, and exact description of the same, reference being had to the accompanying drawings, forming part of this specification, in which—

Figure 1:
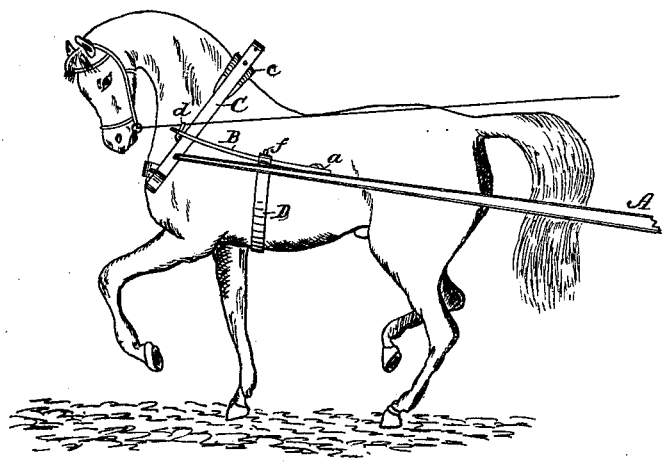
Figure 2:
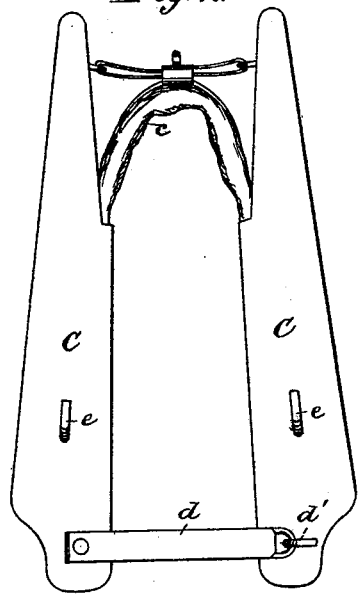
Figure 3:
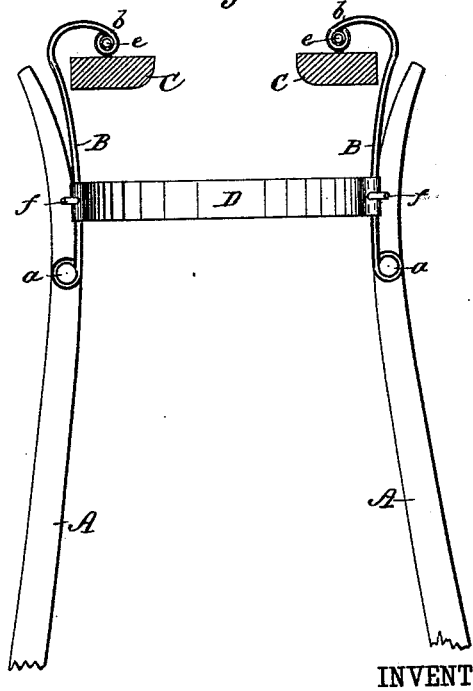

Figure 1 is a side view of my improved harness as applied to a horse when geared to the shafts. Fig. 2 is a front view of the collar. Fig. 3 is a plan view of the shafts, showing in section the position of the collar to the other parts.

My invention is an improvement upon the harness for which Letters Patent were granted me May 20, 1879, in which a rigid yoke or collar, closed at top and open at the bottom, is connected with rigid tug-hooks on the shafts, and constitute, in connection with a belly-band, the only parts which are necessary to gear up the horse.

The improvement consists in making the collar in two pieces, connected at the top by a flexible pad and at the bottom by a strap, and combining it with loose tugs on the shaft, which are bent inwardly at their front ends, so as to take the draft-strain from the center line of the collar-bars, while the belly-band is connected to the loose tugs in front of their pivots, so that said belly-band has a tendency to draw the tugs inwardly to the proper draft-line of the collar without twisting the upright bars of the same, as hereinafter fully described.

In the drawings, A represents the shafts of the vehicle, to which are loosely pivoted at $a$ the horizontally-swinging tugs B, whose forward ends are bent inwardly and formed with eyes $b$.

C C are the collar-bars, connected at the top by a flexible pad, $c$, and at the bottom by a strap, $d$, which is attached to one section of the collar, and has a ring in its end; that is simply placed over a hook, $d'$, on the other section.

Upon the front, and at about the middle line of the collar-bars, is placed on each side a hook, $e$, over which the eyes of the tugs are dropped. Upon these tugs also, between their rear pivoted ends and the eyes in their forward ends, are fixed upwardly-projecting studs $f$, around which and the main portion of the tug the ends of the belly-band D are secured.

The several parts thus described operate together to form a complete harness, which is easier to the animal and quickly geared or ungeared.

In use the strain of the belly-band, coming upon the tugs in front of their pivots, causes the forward and inwardly-bent ends to be held in to the center line of the collar-bars, so that there is no undue twisting action of said bars, and the draft-strain is more directly applied.

For two horses two pair of shafts are used instead of three, as mentioned in my former patent.

Having thus described my invention, what I claim as new is—

The harness herein described, consisting of the tugs B B, pivoted to the shafts in the rear and bent inwardly at their forward ends, the belly-band fastened to the tugs forward of their connection with the shafts, and the separate collar-bars connected by a flexible pad at the top and a strap at the bottom, and having hooks for attachment to the tugs, all combined substantially as described.

FENDAL D. THURMAN.

Witnesses:
S. A. SWANN,
A. B. PHELPS.